United States Patent [19]

Foch et al.

[11] 3,767,522

[45] Oct. 23, 1973

[54] LINEAR HEAT-HARDENABLE COPOLYMERIZATE

[75] Inventors: Jurgen Foch, Essen-Bredeney; Ulrich Holtschmidt, Essen, both of Germany

[73] Assignee: Th. Goldschmidt AG, Essen, Germany

[22] Filed: Oct. 18, 1971

[21] Appl. No.: 190,398

Related U.S. Application Data

[62] Division of Ser. No. 31,748, April 24, 1970, Pat. No. 3,694,418.

[30] Foreign Application Priority Data

May 6, 1969 Germany................... P 19 22 942.6

[52] U.S. Cl. ............................................... 161/232
[51] Int. Cl............................................. B32b 27/10
[58] Field of Search .....................161/231–233, 270; 260/78.5 R, 80.72, 80.8

[56] References Cited
UNITED STATES PATENTS

| | | | |
|---|---|---|---|
| 3,563,953 | 2/1971 | Lehmann et al............. | 260/80.72 X |
| 3,553,153 | 1/1971 | Hazen et al................. | 260/29.6 |
| 3,242,123 | 3/1966 | Mayfield et al.............. | 260/80.8 |
| 3,531,547 | 9/1970 | Hazen et al................. | 260/78.5 R |
| 3,085,920 | 4/1963 | Taylor et al. ............... | 161/232 |
| 3,669,727 | 6/1972 | Raymond..................... | 161/231 X |

*Primary Examiner*—Charles E. Van Horn
*Attorney*—James E. Bryan

[57] ABSTRACT

This invention relates to a linear heat-hardenable copolymerizate, and to a method of treating a wood surface with a foil of the said copolymerizate, the copolymerizate having a limiting viscosity of $\eta = 0.7$ to 3.0 (100 ml · g$^{-1}$) measured in toluene at 20° C., and comprising seventy to 94 mole percent of a compound selected from the group consisting of styrene or at least one monomer having the formula

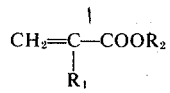

in which $R_1$ is selected from the group consisting of hydrogen and a methyl group, and $R_2$ is an alkyl group having 1 to 4 carbon atoms, two to 15 mole percent of at least one compound selected from the group consisting of maleic anhydride and itaconic acid anhydride, and four to 15 mole percent of at least one compound selected from the group consisting of acrylic acid glycidyl ester and methacrylic acid glycidyl ester.

2 Claims, No Drawings

LINEAR HEAT-HARDENABLE COPOLYMERIZATE

This is a division of application Ser. No. 31,748, filed Apr. 24, 1970, now U.S. Pat. No. 3,694,418.

This invention relates to novel linear heat-hardenable copolymerizates and to the use thereof, preferably in the form of self-supporting foils, for improving the surfaces of raw materials, particularly sheets of wood, by pressing the foils thereon at elevated temperatures.

Known to the art are various linear copolymerizates containing reactive groups which are cross-linked at elevated temperatures with conversion of the thermoplastic copolymerizate into an insoluble and infusible polymerizate.

U. S. Pat. No. 2,604,463, for example, describes a linear thermoplastic copolymerizate obtained from acrylic acid glycidylester, acrylic acid, styrene, and acrylic acid methyl ester. The acrylic acid glycidyl ester and the acrylic acid are present together in the copolymerizate in a quantity such that, when the copolymerizate is heated, a sufficient cross-linking occurs. The quantity of the two aforementioned compounds should not, however, exceed 20 per cent by weight, based upon the weight of the copolymerizate.

French Pat. No. 1,374,297, discloses the preparation of copolymerizates of styrene, ethyl acrylate, acrylic acid, and acrylic acid glycidyl ester in the form of an emulsion. Formed during the reaction are lattices which can be cross-linked after application and drying at temperatures in the range of 100° to 150°C.

U. S. Pat. No. 3,223,670, discloses copolymerizates of vinyl acetate, acrylic acid, itaconic acid, and acrylic acid glycidyl ester. These copolymerizates also are obtained by emulsion polymerization at temperatures in the range of 55° to 60°C.

U. S. Pat. No. 3,242,931, discloses the preparation of an adhesive for plywood consisting of a heat-hardenable copolymerizate obtained, for instance, by emulsion polymerization of vinyl acetate, methacrylic acid glycidyl ester, and acrylic acid. A thickening agent is added to the resulting emulsion.

British Pat. No. 1,025,694, similarly disclosed hardenable copolymerizates of acrylic acid ethyl ester, methacrylic acid glycidyl ester, and acrylic acid. It is disclosed in the patent that these products are well suited for the treatment of surfaces.

The hardenable copolymerizates of the prior art are employed essentially as binding agents for stoving lacquers. Self-supporting foils based on such products, which would be suitable for the pressure coating of wood sheets, are not described. Actually, they would not have been considered for such use because of the hardenable conditions thereof, since the residence time within the heated mold of the materials to be improved would have to be so long as to be prohibitive. This is undesirable not only in view of the long time required, but because it may result in damage to delicate materials, such as wood sheets, which might be damaged either mechanically or chemically by prolonged residence in the mold while subjected to pressure and an elevated temperature.

The present invention provides linear heat-hardenable copolymerizates having relatively short hardening times yet possessing sufficient rheological properties to form pore-free and flawless surface protective layers at moderate pressure, particularly on sheets of wood materials, which protective layers moreover adhere well to such wood bases.

The copolymerizates of the present invention contain Seventy to 94 mole per cent of styrene or one or more monomers having the formula

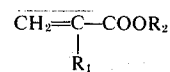

wherein $R_1$ is hydrogen or a methyl group, and $R_2$ is an alkyl group having from 1 to 4 carbon atoms, Two to 15 mole percent of maleic anhydride and/or itaconic acid anhydride, and Four to 15 mole percent of acrylic acid glycidyl ester and/or methacrylic acid glycidyl ester.

The copolymerizate also may contain 0 to 3 mole percent of vinyl pyridine. The copolymerizate has a limiting viscosity of $\eta = 0.7$ to $3.0$ ($100$ ml $\cdot$ g$^{-1}$) measured in toluene at 20°C.

The structure of the copolymerizate may be recognized from essentially three specific types of monomers, i.e.:

1. Present in an excess amount, based upon the weight of the copolymerizate, is a carrier monomer or a mixture of several carrier monomers. These carrier monomers are either alkyl esters or acrylic acid or methacrylic acid, wherein the alkyl residue of the alcohol employed for the esterification has from 1 to 4 carbon atoms, or mixtures of such acrylic acid and methacrylic acid esters or, instead of these esters, styrene may be employed.

Exemplary of the acrylic acid and methacrylic acid esters are methyl, esters, ethyl esters, propyl esters, and butyl esters.

2. Smaller portions of maleic anhydride and/or itaconic acid anhydride, as compared to the carrier monomer. The use of unsaturated cyclic dicarboxylic acid anhydrides as compounds capable of reacting with glycidyl groups constitutes an essential part of the present invention since these anhydrides effect the rapid hardening of the copolymerizates and thereby render them useable for the intended application.

3. Acrylic and/or methacrylic acid glycidyl esters are employed as monomers containing glycidyl groups.

It is possible to employ, as a fourth polymerization component, vinyl pyridine in small quantities; it catalyzes the hardening process because of its basic properties and is built into the polymerizate by means of its vinyl group.

Since the copolymerizates are designed particularly for improving the surfaces of materials made from wood, it is necessary that the copolymerizates, during heating thereof under pressure and prior to being completely hardened, have a sufficient rheological capacity in order, on one hand, to become adequately bonded to the base while simultaneously forming a sealed surface, on the other hand. For this purpose, it is necessary that the copolymerizates not exceed a specific molecular weight. The novel linear heat-hardenable copolymerizates have, therefore, a limiting viscosity characterizing the molecular weight (Staudinger index of 0.7 to 3.0), measured in toluene at 20°C.

Self-supporting foils made from the novel copolymerizates can be stored for a practically unlimited time at normal temperatures. Yet, even under unfavorable conditions, for example when exposed to elevated temperatures during storage, the foils may be stored for a length of time corresponding to the consumption thereof.

In the course of the hardening of the linear copolymerizates at elevated temperatures, the carboxylic acid anhydride groups contained in the polymerizate react with the glycidyl groups with the formation of a three-dimensional reticular structure. This cross-linking reaction can be illustrated in a simplified manner as follows:

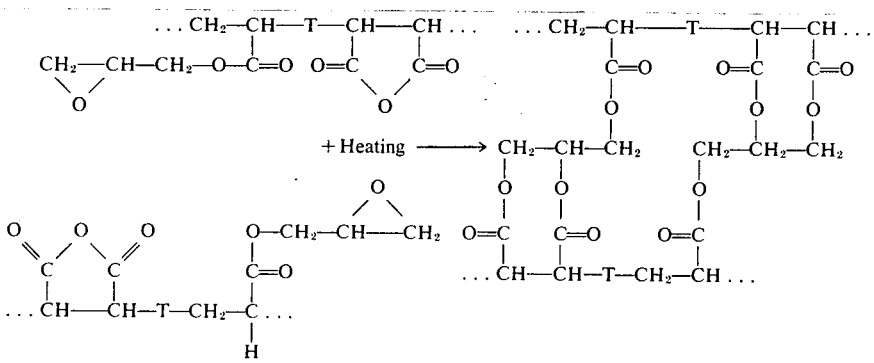

In this general structure, T signifies the carrier monomer.

The preparation of the linear heat-hardenable copolymerizate is effected in known manner, while care must be taken to ensure that no cross-linking or at least no significant cross-linking occurs during the copolymerization. For this reason, two polymerization processes have been found to be useful:

(a) Particularly advantageous is emulsion polymerization at low temperatures, particularly in the range of 0° to 20°C. For the purpose of preparing the emulsion, it is possible to employ conventional emulsifiers among which the following are exemplary: sodium lauryl sulfate, sodium dodecyl diphenyl sulfonate, polyethylene glycol isooctyl phenyl ether, sodium alkyl acrylic polyether sulfonate, sodium tetra-N-1 (1,2-dicarboxyethyl)-N-octadecyl sulfosuccinate, polyethylene glycol nonylphenyl ether, and polyethylene glycol tridecyl alcohol ether.

The emulsion polymerization may be performed at controlled pH values, and sodium acetate, sodium hydrogen phosphate and sodium oxalate are particularly suitable as buffer salts.

Usable as redox-initiating systems are preferably peroxides and hydroperoxides in combination with iron (II)-salts, ascorbic acid, and sodium formaldehyde sulfoxylate. The bivalent iron also may be employed in the form of the ethylene diamine tetraacetic acid complex. An especially suitable peroxide is cumene hydroperoxide.

In connection with the determination of the quantities of unsaturated monomeric compounds required for the preparation of the copolymerizate, it should be taken into account that, on the basis of the varying reactivity and reaction velocity, the quantities of the reactants in the reaction do not correspond exactly to the quantities of the different compounds contained in the polymerizate. The amounts to be employed are best determined on the basis of a preliminary test.

The emulsion polymerization preferably is carried out in the following manner:

The emulsifier, dissolved in water, is added to water which is free from oxygen as much as possible. While stirring, cooling is effected to −5° to +20°C., preferably 0°C., and the reduced portion of the initiator, the buffer, and the entire monomeric mixture are then added, whereby a pH value between 3 and 5 will result. Then the peroxide, which previously was dissolved in a small amount of carrier monomer, is added. Until complete conversion is attained, stirring is effected in an atmosphere of nitrogen. After completion of the reaction, the polymerizate is precipitated from the emulsion with an excess of methanol. The reaction mixture is washed with water and the remaining water is removed insofar as possible by means of a filter press. The reaction product thus obtained is then incorporated into various organic solvents and may be poured out to films which harden completely at temperatures between 100° and 150° C. under pressure.

b. The polymerization of the monomers in solvents renders possible the use of somewhat higher temperatures so that working can be effected at temperatures in the range of about 20° to 80°C. The solvent and the diluent both should have the capacity for dissolving the resulting polymerizate. Exemplary of such solvents are: dioxane, methylene chloride, acetone, and mixtures of methylethyl ketone or isopropyl alcohol with toluene. Generally speaking, the weight ratio of the polymerizable monomers to the solvent should be approximately 3 to 4:1. The known polymerization initiators, such as, for example, azodiisobutyric acid nitrile, benzoyl peroxide, cumene hydroperoxide, or cumene peroxide may be employed in a quantity of about 0.5 percent by weight, based upon the weight of the monomer.

When foils are made from the novel linear heat-hardenable copolymerizates, for example by dissolving the copolymerizates in a suitable solvent, casting the same and allowing the solvent to evaporate, transparent products are obtained which are well suited for being further treated and which, when pressed upon wood, for example at a temperature in the range of 120° to 160° C., preferably 140°C. and at a pressure of about 25 kg/cm², yield hard, well adhering, completely transparent films which are resistant to dilute acids and alkalies, as well as alcohol and benzine. The films do not swell, or swell only negligibly, under the action of chlorinated solvents.

The invention will be further illustrated by reference to the following examples in which all parts are parts by weight.

Example 1

100 parts of water are freed from dissolved oxygen by boiling under nitrogen and are thereafter cooled to 0°C. Added thereto are 6 parts of sodium lauryl sulfate (dissolved in 20 parts of oxygen-free water), 44 parts of styrene, 4.4 parts of acrylic acid glycidyl ester, and 1.7 parts of maleic anhydride. The mixture is homogenized and then added thereto, drop by drop, are 5 parts of sodium acetate (dissolved in 5 parts of oxygen-free water), 1.2 parts of iron (II)-ammonium sulfate (dissolved in 5 parts of oxygen-free water) and 0.28 part of cumene hydroperoxide (dissolved in 2 parts of styrene). During reaction, the temperature is constantly maintained at 0°C. After 40 hours, the emulsion is introduced into 750 parts of methanol; the precipitated polymerizate is washed with water, again introduced into 750 parts of methanol, and then filtered in a filter press. The yeild amounts to 95 per cent of theoretical. The polymerizate is soluble in benzene, toluene, methylene chloride, methylethyl ketone and tetrahydrofuran. The Staudinger index in toluene at 20°C. is $\eta = 2.76$ (100 ml · g$^{-1}$). Acid anhydride and glycidyl groups are proven to be present qualitatively by infra-red spectroscopy and quantitatively by titration with KOH and HCl, respectively. The acid anhydride content is 3.3 per cent by weight, and the glycidyl content is 8.7 per cent by weight and 8.8 per cent by weight, respectively. Also proven by the IR spectrum, aside from the anhydride and glycidyl groups, is a higher proportion of carboxylic acid groups. A film pressed upon wood does not display the brown coloration mentioned in connection with Example 1. The Buchholz hardness (DIN 53153) is 105.

Example 3

Following the procedure of Example 1, a series of experiments is performed in which varying quantities of maleic anhydride and acrylic acid glycidyl ester are employed. Styrene is replaced by methacrylic acid ethyl ester, and sodium acetate is replaced by disodium hydrogen phosphate.

The following table shows the content of maleic anhydride and acrylic acid glycidyl ester in the monomeric mixture; the reaction duration, the conversion, the Staudinger index in xylene, the swelling index after heating at 180°C. for 10 minutes, as well as the gel content after cross-linking.

| Maleic anhydride (mole %) | Acrylic acid glycidyl ester (mole %) | Duration reaction (h) | Conversion (%) | (100 ml·g$^{-1}$) (20° C.) | Swelling index according to Dannenberg | Gel content (%) |
|---|---|---|---|---|---|---|
| 5 | 5 | 4 | 88 | 1.62 | 2.50 | 99 |
| 5 | 10 | 4.5 | 93 | 1.40 | 1.95 | 99 |
| 5 | 15 | 4.5 | 95 | 1.08 | 1.90 | 100 |
| 10 | 5 | 5 | 93 | 1.25 | 2.25 | 97 |
| 10 | 10 | 4.5 | 90 | 1.20 | 1.80 | 99 |
| 15 | 5 | 4.5 | 83 | 1.07 | 2.40 | 92 |
| 15 | 10 | 4.5 | 85 | 0.88 | 2.10 | 98 | cent by weight. The initial conversion velocity of the polymerization amounts to 15% · h$^{-1}$.

A film pressed upon wood at a temperature of 140°C. for 15 minutes at a pressure of 25 kg/cm$^2$ is transparent, has a Buchholz hardness (DIN 53153) of 100 and is of a light brown color. The adhesiveness is excellent. Corrosion due to a tension-fissure formation after the action of either methanol or ethanol-water mixtures does not occur. The hardened film is resistant to dilute acid and alkalies, alcohol and benzine. Only a moderate swelling occurs after a 24-hour treatment with methylene chloride or ethyl acetate. Film samples were heated for 10 minutes at 150°C. and thereafter treated with boiling chloroform: the gel content was found to be 100 percent. The swelling index according to H. Dannenberg and W. R. Harp, Jr., Anal. Chem. 28 (1956) 86 (determined after standing for 24 hours in a 1,2-dichloroethane atmosphere) is 2.1. A film kept for 3 months at room temperature is actually slightly cross-linked but, during pressing, still displays a good rheological capacity.

Example 2

The procedure of Example 1 is repeated except that employed in the place of iron (II)-ammonium sulfate is a mixture of 0.1 part of sodium formaldehyde sulfoxylate, 0.015 part of ethylene diamine tetraacetic acid and 0.75 part of iron (II)-chloride hydrate. The yield after 24 hours is 90 percent of theoretical. The initial conversion velocity is 17.5% · h$^{-1}$. The Staudinger index in toluene at 20°C. is $\eta = 2.3$ (100 ml · g$^{-1}$). The swelling index is 1.7 at a temperature of 150°C. and 10 minutes time. The gel content is 100 percent. The acid anhydride and glycidyl group content is 3.4 per cent by As described in Example 1, the films are pressed; they are transparent, hard, and show no tension-fissure corrosion after a prolonged treatment with methanol; they are not affected by dilute acids and alkalies. The swelling in methylene chloride and ethyl acetate decreases with an increasing content of acrylic acid glycidyl ester.

Example 4

100 parts of oxygen-free water are cooled to 0°C., and added thereto are 5 parts of p-ter.-octyl phenoxy polyethylene glycol ether, 40 parts of methacrylic acid methyl ester, 4 parts of acrylic acid glycidyl ester, and 6.1 parts of maleic anhydride. The mixture is homogenized and then added thereto, drop by drop, are 3 parts of disodium hydrogen phosphate, 1.2 parts of iron (II)-ammonium sulfate (dissolved in 5 parts of oxygen-free water) and 0.28 part of cumene hydroperoxide (dissolved in 2 parts of methacrylic acid methyl ester). The conversion after 6 hours is 93 percent of theoretical. The Staudinger index in chloroform at 20°C. is $\eta = 1.5$ (100 ml · g$^{-1}$). The initial conversion velocity is 150% · h$^{-1}$. The swelling index is 1.9 at 150° C. and 10 minutes time. The gel content is 99 percent. The acid anhydride content is 2.9 percent by weight; the glycidyl content is 7.5 percent by weight. The IR spectrum is: anhydride and glycidyl groups positive.

Films pressed upon wood at a temperature of 145°C. for 10 minutes are transparent, hard, excellent with respect to the adhesiveness thereof, have a Buchholz hardness (DIN 53153) of 110, and are not affected by dilute acids and alkalies. After the action of methylene chloride and ethyl acetate, a slight swelling occurs after 24 hours; test benzine has no adverse effect. A film stored for 3 months is still capable of flowing during pressing.

Example 5

The procedure of Example 4 above is repeated but employed instead of 40 parts of methacrylic acid methyl ester is a mixture of 20 parts of methacrylic acid methyl ester and 20 parts of methacrylic acid-n-butyl ester. Further, only 3.05 parts of maleic anhydride are used. The conversion after 8 hours is 94 percent of theoretical. The Staudinger index in chloroform at 20°C. is $\eta = 2.05$ (100 ml · $g^{-1}$). The initial conversion velocity is 165% · $h^{-1}$. The swelling index at 150°C. and 10 minutes time is 2.1. The gel content is 100 percent. The acid anhydride content is 2.8 percent by weight, and the glycidyl content is 7.4 percent by weight.

Films pressed upon wood at a temperature of 145°C. for 10 minutes are transparent, hard, excellent with respect to adhesiveness thereof, have a Buchholz hardness (DIN 53153) of 95, and are not affected by dilute acids and alkalies. Methylene chloride and ethyl acetate swell them only to a minor extent; test benzine has no adverse effect. No tension-fissure corrosion after the action of methanol or ethanol-water mixtures is noted. A film stored for 3 months is still capable of flowing during pressing.

Example 6

The procedure of Example 4 is followed with the further addition, however, to the monomeric mixture of 1.8 parts of vinyl pyridine. The conversion after 5 hours is 93 per cent. The initial conversion velocity is 160% · $h^{-1}$. The Staudinger index in chloroform at 20°C. is $\eta = 0.95$. The swelling index is 1.9 at a temperature of 150°C. and 10 minutes time. The gel content is 100 percent. The acid anhydride content is 2.9 percent by weight, and the glycidyl content is 7.5 per cent by weight. The IR spectrum shows anhydride and glycidyl groups positive.

Films pressed upon wood at a temperature of 145°C. for 10 minutes are transparent, hard, excellent with respect to the adhesiveness thereof, have a Buchholz hardness (DIN 53153) of 115, and are not affected by dilute acids and alkalies. After the action of methylene chloride and ethyl acetate, only a minor amount of swelling occurs after 24 hours; test benzine has no adverse effect.

Example 7

Added to 100 parts of oxygen-free water at a temperature of 0°C. are 6 parts of sodium lauryl sulfate (dissolved in 20 parts of oxygen-free water), 50 parts of methacrylic acid butyl ester, 5 parts of acrylic acid glycidyl ester and 5 parts of itaconic acid anhydride. The mixture is homogenized and then added thereto, drop by drop, are 3 parts of disodium hydrogen phosphate, 1.2 parts of iron (II)-ammonium sulfate (dissolved in 5 parts of oxygen-free water), and 0.28 part of cumene hydroperoxide (dissolved in 2 parts of methacrylic acid butyl ester). The conversion after 8 hours is 90 percent of theoretical. The initial conversion velocity is 14% · $h^{-1}$. The Staudinger index in chloroform at 20°C. is $\eta = 0.90$. The swelling index is 2.5 at 150°C. and 10 minutes time. The gel content is 96 percent. The acid anhydride content is 5.8 percent by weight, and the glycidyl content is 7.8 per cent by weight. The IR spectrum shows: anhydride and glycidyl groups positive.

Foils pressed upon wood at a temperature of 145°C. for 10 minutes are transparent, medium hard, well adhesive, have a Buchholz hardness (DIN 53153) of 80, and are not affected by dilute acids and alkalies. After the action of methylene chloride, ethanol, acetone and ethyl acetate, a very small swelling occurs after 24 hours; test benzine has no adverse effect. The foil is resistant against tension-fissure corrosion.

Example 8

Added to 100 parts of oxygen-free water at a temperature of 0°C. are 5 parts of p-tert.-octyl phenoxy polyethylene glycol ether (dissolved in 20 parts of oxygen-free water), 20 parts of methyl methacrylate, 20 parts of ethyl acrylate, 4 parts of glycidyl acrylate, and 6.1 parts of maleic anhydride. The mixture is homogenized and then added thereto, drop by drop, are 3 parts of disodium hydrogen phosphate, 1.2 parts of iron (II)-ammonium sulfate and 0.28 part of cumene hydroperoxide (dissolved in 2 parts of methyl methacrylate). The conversion after 8 hours is 90 percent of theoretical. The initial conversion velocity is 145% · $h^{-1}$. The Staudinger index in toluene at 20°C. is $\eta = 1.02$. The swelling index is 2.9 at 150°C. and 10 minutes time. The gel content is 98 percent. The acid anhydride content is 3.3 percent by weight and the glycidyl content is 8.0 percent by weight. The IR spectrum shows: anhydride and glycidyl groups positive.

Foils pressed upon wood at a temperature of 145°C. for 10 minutes are transparent, well adhesive, have a Buchholz hardness of 90, and are not affected by dilute acids and alkalies. Acetone, ethyl acetate and ethanol swell them only very slightly after a 24-hour treatment.

Example 9

200 parts of dioxane are freed from dissolved oxygen by boiling at reflux under nitrogen. Then added are 33.2 parts of methyl methacrylate, 10.7 parts of itaconic acid anhydride, and 6.1 parts of glycidyl acrylate. The batch is stirred at a temperature of 20°C. under nitrogen; initially added are 0.25 part and after 2, 4, 6 and 8 hours, 0.05 part of azo-diiso-butyric acid nitrile (each 0.05 part being dissolved in 2 ml of methylene chloride). The conversion after 67 hours is 92 percent of theoretical. The Staudinger index in tetrahydrofuran at 20°C. is $\eta = 0.5$. The swelling index is 1.0 at 150°C. for 10 minutes time. The gel content is 99 percent. The acid anhydride content is 9.8 percent by weight and the glycidyl content is 13.8 per cent by weight. The IR spectrum shows: anhydride and glycidyl groups positive.

Foils pressed upon wood at a temperature of 145°C. for 10 minutes are transparent, well adhesive, have a Buchholz hardness (DIN 53153) of 115, and are unaffected by dilute acids and alkalies, by test benzine and ethanol. Methylene chloride, ethyl acetate and acetone cause only slight swelling after a 24-hour treatment.

Example 10

Added to 200 parts of oxygen-free methylene chloride are 33.2 parts of methyl methacrylate, 4.6 parts of maleic anhydride, and 12.2 parts of glycidyl acrylate. Thereafter, stirring is effected under nitrogen at 40°C., and then added are initially 0.25 part, and thereafter, after 2, 4, 6 and 17 hours, a 0.05 part quantity of azodiisobutyric acid nitrile. The conversion after 80 hours is 86 percent of theoretical. The Staudinger index in tetrahydrofuran at 20°C. is $\eta = 0.62$. The swelling index is 1.9 at 150°C. and 10 minutes time. The gel content is 98 per cent. The acid anhydride content is 2.6 per cent by weight and the glycidyl content is 19.3 percent by weight. The IR spectrum shows: anhydride and glycidyl groups positive.

Foils pressed upon wood at a temperature of 145°C. for 10 minutes are transparent, adhesive, have a Buchholz hardness (DIN 53153) of 110, and are unaffected by dilute acids and alkalies. Methylene chloride, ethyl acetate and acetone cause only minor swelling after a 24-hour treatment.

It will be obvious to those skilled in the art that many modifications may be made within the scope of the present invention without departing from the spirit thereof, and the invention includes all such modifications.

What is claimed is:

1. An improved wood surface having a foil of a linear heat-hardenable copolymerizate having a limiting viscosity of $\eta = 0.7$ to 3.0 (100 ml · g$^{-1}$) measured in toluene at 20°C, and comprising
    70 to 94 mole percent of styrene,
    2 to 15 mole percent of at least one compound selected from the group consisting of maleic anhydride and itaconic acid anhydride, and
    4 to 15 mole percent of at least one compound selected from the group consisting of acrylic acid glycidyl ester and methacrylic acid glycidyl ester.

2. A wood surface according to claim 1 in which the copolymerizate includes, in addition, not in excess of 3 mole percent of vinyl pyridine.

* * * * *

UNITED STATES PATENT OFFICE
CERTIFICATE OF CORRECTION

Patent No. 3,767,522          Dated October 23, 1973

Inventor(s) Jürgen Fock et al

It is certified that error appears in the above-identified patent and that said Letters Patent are hereby corrected as shown below:

Covering page, Item 75 "Jurgen Foch" should read - - - Jürgen Fock - - -.

Column 1, line 43, "disclosed" should read - - - discloses - - -.

Column 2, line 33, "methyl," should read - - - methyl - - -.

Column 5, line 13, "yeild" should read - - - yield - - -.

Column 10, line 4, after "copolymerizate" the following should be inserted - - - bonded thereto, the copolymerizate - - -.

Signed and sealed this 19th day of February 1974.

(SEAL)
Attest:

EDWARD M. FLETCHER, JR.
Attesting Officer

C. MARSHALL DANN
Commissioner of Patents